US009132577B2

(12) United States Patent
Galt

(10) Patent No.: US 9,132,577 B2
(45) Date of Patent: Sep. 15, 2015

(54) MELT-DELIVERY ASSEMBLY INCLUDING FRAME ASSEMBLY POSITIONED OUTSIDE OF PLATEN ENVELOPE, AND HAVING MULTIPLE-OUTLET ASSEMBLY

(75) Inventor: John Robert Galt, Nobleton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 13/995,550

(22) PCT Filed: Dec. 8, 2011

(86) PCT No.: PCT/CA2011/050756
§ 371 (c)(1),
(2), (4) Date: Jun. 19, 2013

(87) PCT Pub. No.: WO2012/092658
PCT Pub. Date: Jul. 12, 2012

(65) Prior Publication Data
US 2013/0273193 A1    Oct. 17, 2013

Related U.S. Application Data

(60) Provisional application No. 61/431,021, filed on Jan. 9, 2011.

(51) Int. Cl.
*B29C 45/18*    (2006.01)
*B29C 45/46*    (2006.01)
*B29C 45/27*    (2006.01)

(52) U.S. Cl.
CPC ............... *B29C 45/18* (2013.01); *B29C 45/46* (2013.01); *B29C 45/2725* (2013.01)

(58) Field of Classification Search
CPC ............ B29C 44/2602; B29C 45/2725; B29C 45/2673; B29C 45/2675; B29C 45/273; B29C 45/2703
USPC .......... 425/530, 522, 533, 536, 538, 541, 556
See application file for complete search history.

(56) References Cited

U.S. PATENT DOCUMENTS

| 2,871,517 A | 2/1959 | Allard |
| 3,985,486 A | 10/1976 | Hendry |
| 5,522,720 A | 6/1996 | Schad |

(Continued)

FOREIGN PATENT DOCUMENTS

| CA | 2437294 C | 2/2004 |
| JP | S61193817 A | 8/1986 |
| JP | S6463116 A | 3/1989 |
| JP | 2002154137 A | 5/2002 |

OTHER PUBLICATIONS

Franz, Fourne, "Synthetic Fibers", ISBN I-56990-250-X, 1998, pp. 275-282.

(Continued)

*Primary Examiner* — Jacob Thomas Minskey

(57) ABSTRACT

A melt-delivery assembly (200), comprising: a frame assembly (202) being positioned outside of a platen envelope (153) being defined by a platen assembly (150), the frame assembly (202) being configured to receive a melt from a melt-preparation assembly (110), and the frame assembly (202), including: a multiple-outlet assembly (204) being configured to fluidly deliver the melt to multiple conduits (207) toward the platen envelope (153).

19 Claims, 14 Drawing Sheets

(56) References Cited

U.S. PATENT DOCUMENTS

Figure 1:
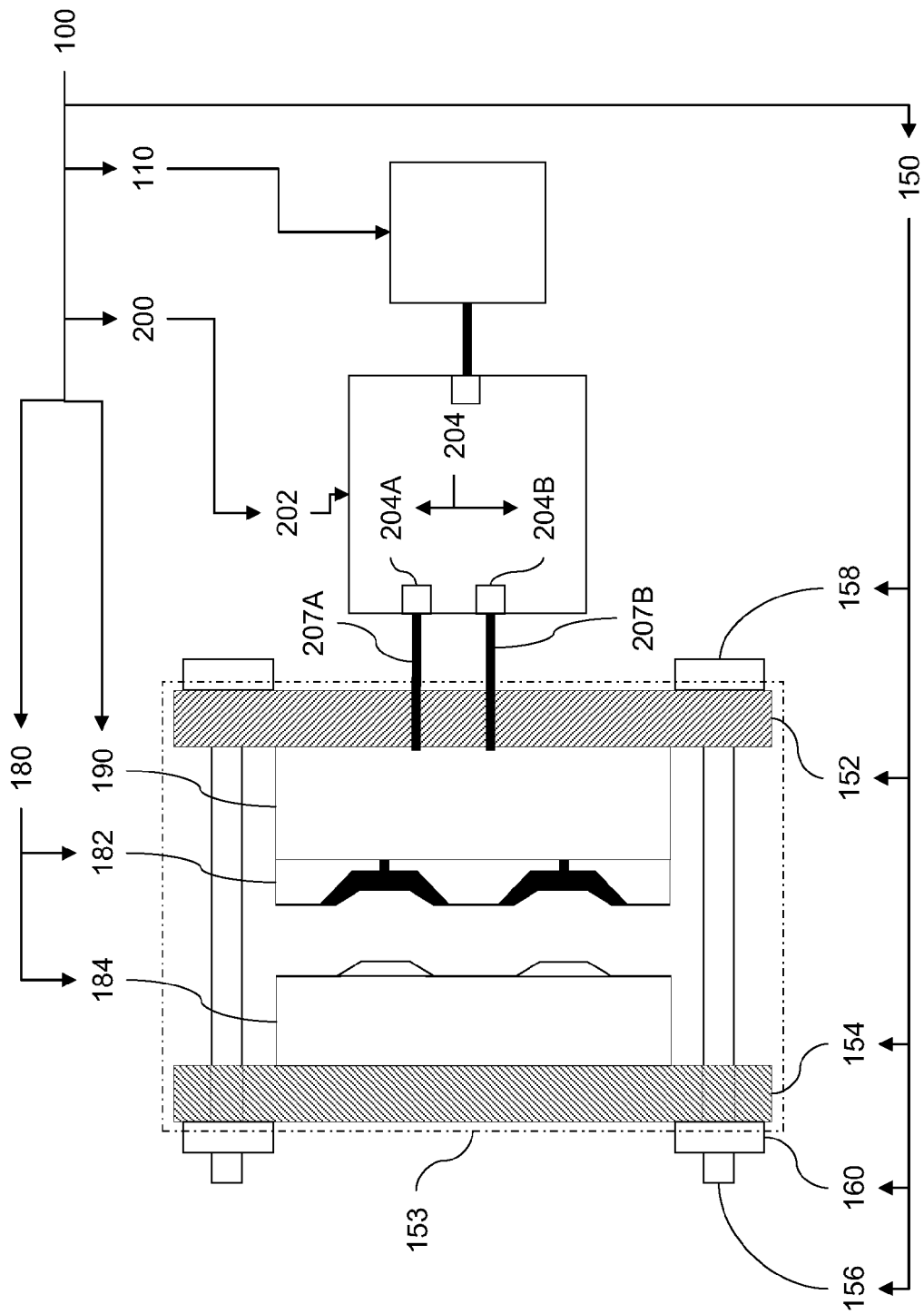

| | | | |
|---|---|---|---|
| 2008/0290541 A1* | 11/2008 | Baumann | 264/40.6 |
| 2008/0317896 A1* | 12/2008 | Boxwala et al. | 425/547 |
| 2009/0191302 A1* | 7/2009 | Jenko et al. | 425/549 |
| 2012/0276235 A1* | 11/2012 | Belzile et al. | 425/150 |

OTHER PUBLICATIONS

European Search Report, Gerald Gemeinböck, Sep. 1, 2014, 7 pages.

* cited by examiner

MELT-DELIVERY ASSEMBLY INCLUDING FRAME ASSEMBLY POSITIONED OUTSIDE OF PLATEN ENVELOPE, AND HAVING MULTIPLE-OUTLET ASSEMBLY

TECHNICAL FIELD

An aspect generally relates to (but is not limited to) a melt-delivery assembly and/or a molding system having a melt-delivery assembly.

SUMMARY

According to one aspect, there is provided a melt-delivery assembly, comprising: a frame assembly positioned outside of a platen envelope, the frame assembly configured to receive a melt from a melt-preparation assembly, and the frame assembly, including (by way of example and is not limited to): a multiple-outlet assembly configured to fluidly deliver the melt to multiple conduits toward the platen envelope.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 1 to 14 (inclusive) depict various schematic representations of a melt-delivery assembly (200).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

By way of example, and not limited to any specific details provided in the Detailed Description, FIGS. 1 to 14 (inclusive) depict the schematic representations of the melt-delivery assembly (200). It will be appreciated that the melt-delivery assembly (200) may include (and is not limited to) components that may be known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (by way of example and is not limited to)" is equivalent to the word "comprising." The word "comprising" is a transitional phrase or word that links the preamble of a patent claim to the specific elements set forth in the claim, which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

Referring to FIG. 1, the melt-delivery assembly (200) may include (by way of example and is not limited to): a frame assembly (202). The frame assembly (202) may be positioned outside of a platen envelope (153). The platen envelope (153) may be defined, for example, as an outer perimeter or boundary that extends around the outer limits of a platen assembly (150); an example of the platen assembly (150) is provided further below. The frame assembly (202) may be configured to receive a melt. The melt may be provided by a melt-preparation assembly (110). Examples of the melt-preparation assembly (110) may include (by way of example and is not limited to): an extruder assembly having (by way of example and is not limited to) a hopper unit connected to a barrel unit with a screw assembly received in the barrel unit. The melt-preparation assembly (110) may be an assembly that is configured to: (i) receive a solidified resin (pellets for example, etc), and (ii) convert or prepare the resin into the melt, which is a flowable liquid, and then to provide the melt to the melt-delivery assembly (200). The frame assembly (202) may include (by way of example and is not limited to): a multiple-outlet assembly (204). The multiple-outlet assembly (204) may be configured to fluidly deliver the melt to multiple conduits (207) toward the platen envelope (153). The multiple conduits (207) may include (by way of example and is not limited to): a first conduit (207A), and a second conduit (207B). By way of example, the multiple-outlet assembly (204) may include (by way of example and is not limited to): an outlet (204A) and an outlet (204B) that may be spaced apart from the outlet (204A). FIG. 1 also depicts the following schematic representation of the following assemblies, such as: (i) a molding system (100), (ii) the melt-preparation assembly (110), (iii) the platen assembly (150), and (iv) a runner assembly (190). It will be appreciated that the molding system (100), the melt-preparation assembly (110), the platen assembly (150), the runner assembly (190) and the melt-delivery assembly (200) may be assembled and sold by one vendor or may be supplied by various vendors in any permutation and combination as assemblies. The runner assembly (190) is an assembly that is connected to and is supported by the platen assembly (150), and the runner assembly (190) may be used to distribute the melt to the mold assembly (180). By way of example, it will be appreciated that the melt-preparation assembly (110) may include (by way of example and is not limited to): the melt-delivery assembly (200). In addition, it will also be appreciated that the platen assembly (150) may include (by way of example and is not limited to): the melt-delivery assembly (200). Also, it will be appreciated that the mold assembly (180) may include (by way of example and is not limited to): the melt-delivery assembly (200). And as well, it will be appreciated that the molding system (100) may include (by way of example and is not limited to): the melt-delivery assembly (200). And in addition, it will be appreciated that the molding system (100) may include (by way of example and is not limited to): (i) the platen assembly (150) and the melt-preparation assembly (110) both configured to cooperate with the melt-delivery assembly (200). The platen assembly (150) may include (by way of example and is not limited to): (i) a stationary platen (152), (ii) a movable platen (154), (iii) a rod assembly (156), (iv) a clamp unit (158), and (v) a lock assembly (160). The movable platen (154) may be configured to be movable relative to the stationary platen (152). The rod assembly (156) may be configured to extend between the stationary platen (152) and the movable platen (154). The clamp unit (158) may be attached to each end of a respective rod of the rod assembly (156) at the stationary platen (152). The lock assembly (160) may be attached to each end of a respective rod of the rod assembly (156) at the movable platen (154). The clamp unit (158) may be configured to selectively apply, in use, a clamping force to the stationary platen (152) and the movable platen (154). The lock assembly (160) may be configured to lock or prevent movement of the movable platen (154) relative to the stationary platen (152) while the clamping force is received, in use, by the stationary platen (152) and the movable platen (154). The stationary platen (152) and the movable platen (154) are configured to support a mold assembly (180). The mold assembly (180) may include (by way of example and is not limited to): (i) a stationary-mold portion (182), and (ii) a movable-mold portion (184) that may be configured to be movable relative to the stationary-mold portion (182). The stationary platen (152) may be configured to support and connect with the stationary-mold portion (182). The movable platen (154) may be configured to support and connect with the movable-mold portion (184), so that the stationary-mold portion (182) and the movable-mold portion (184) face each other. The mold assembly (180) may define a plurality of mold cavities that may be used for receiving the melt from the melt-preparation assembly (110), and the melt then may solidify within the mold cavities so as to form mold articles, such as PET (polyethylene terephthalate) performs, etc. The frame assembly (202) may be set apart from the melt-preparation assembly (110). The frame assembly (202) may be positioned between the platen assembly (150) and the melt-preparation assembly (110). The frame assembly (202) may be positioned between a stationary platen (152) of the platen assembly (150) and the melt-preparation assembly (110). It will be appreciated that for the remaining FIGS. 1 to 13, only a limited aspect of the platen assembly (150) may be depicted.

Figure 2:
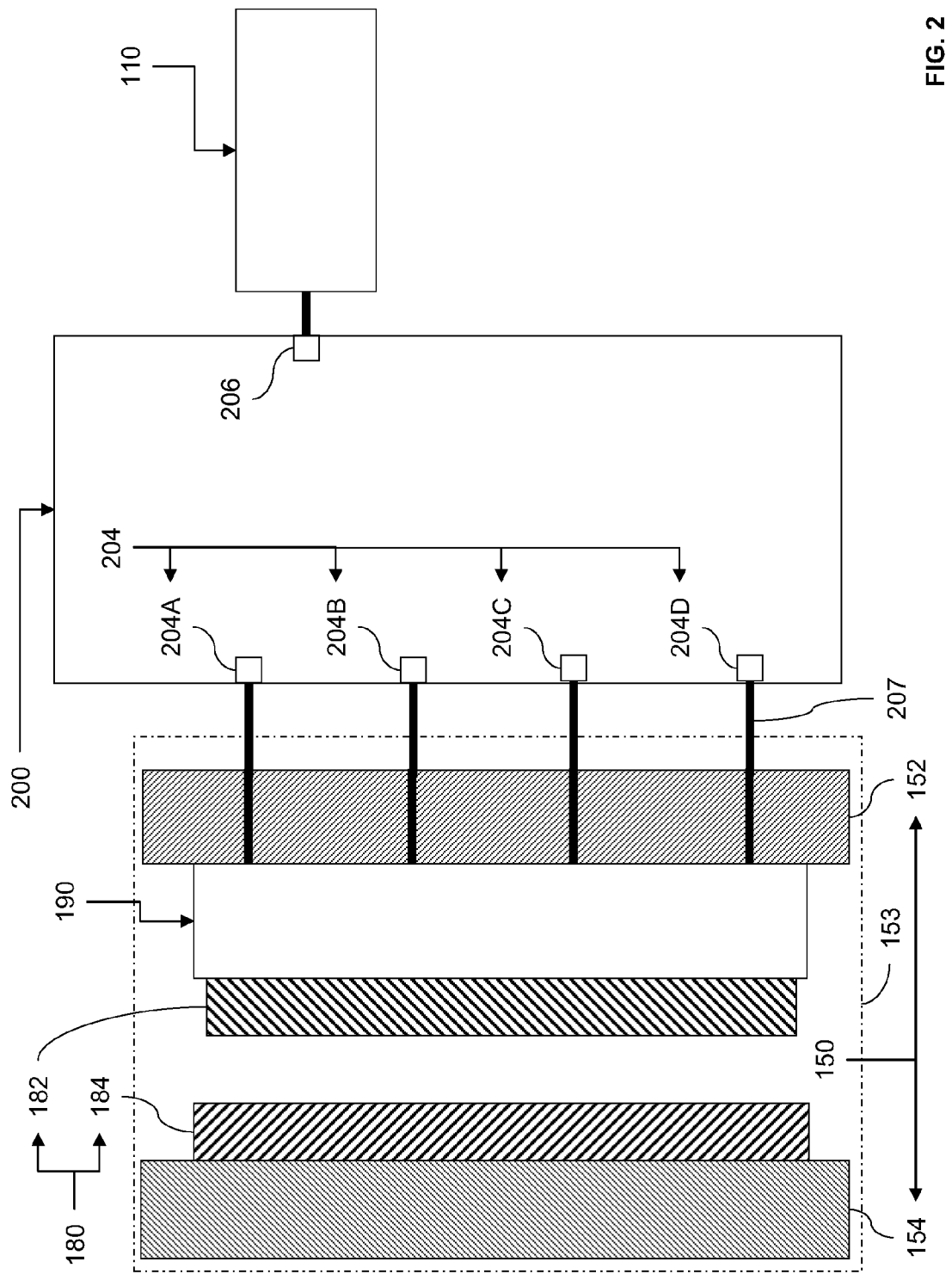

Referring to FIG. 2, the melt-delivery assembly (200) of FIG. 1 may be modified or may be adapted such that the frame assembly (202) may be configured to support an inlet (206) configured to: (i) fluidly communicate with the melt-preparation assembly (110), and (ii) receive, in use, a melt being prepared and provided, in use, by the melt-preparation assembly (110). In addition, the multiple-outlet assembly (204) may be configured to: (i) fluidly communicate with the inlet (206), and (ii) transmit, in use, the melt toward a mold assembly (180) being supported by a platen assembly (150). By way of the example depicted in FIG. 2, the multiple-outlet assembly (204) may include (by way of example and is not limited to): an outlet (204A), an outlet (204B), an outlet (204C), an outlet (204D). According to one variation, the stationary platen (152) may be configured to support the runner assembly (190), and the multiple-outlet assembly (204) may be configured to transmit, in use, the melt from the melt-preparation assembly (110) to the runner assembly (190). According to another variation, the stationary platen (152) may be configured to support the runner assembly (190), and the multiple-outlet assembly (204) may be configured to transmit, in use, the melt from the melt-preparation assembly (110) to the runner assembly (190) along the multiple conduits (207) extending through the stationary platen (152).

Figure 3:
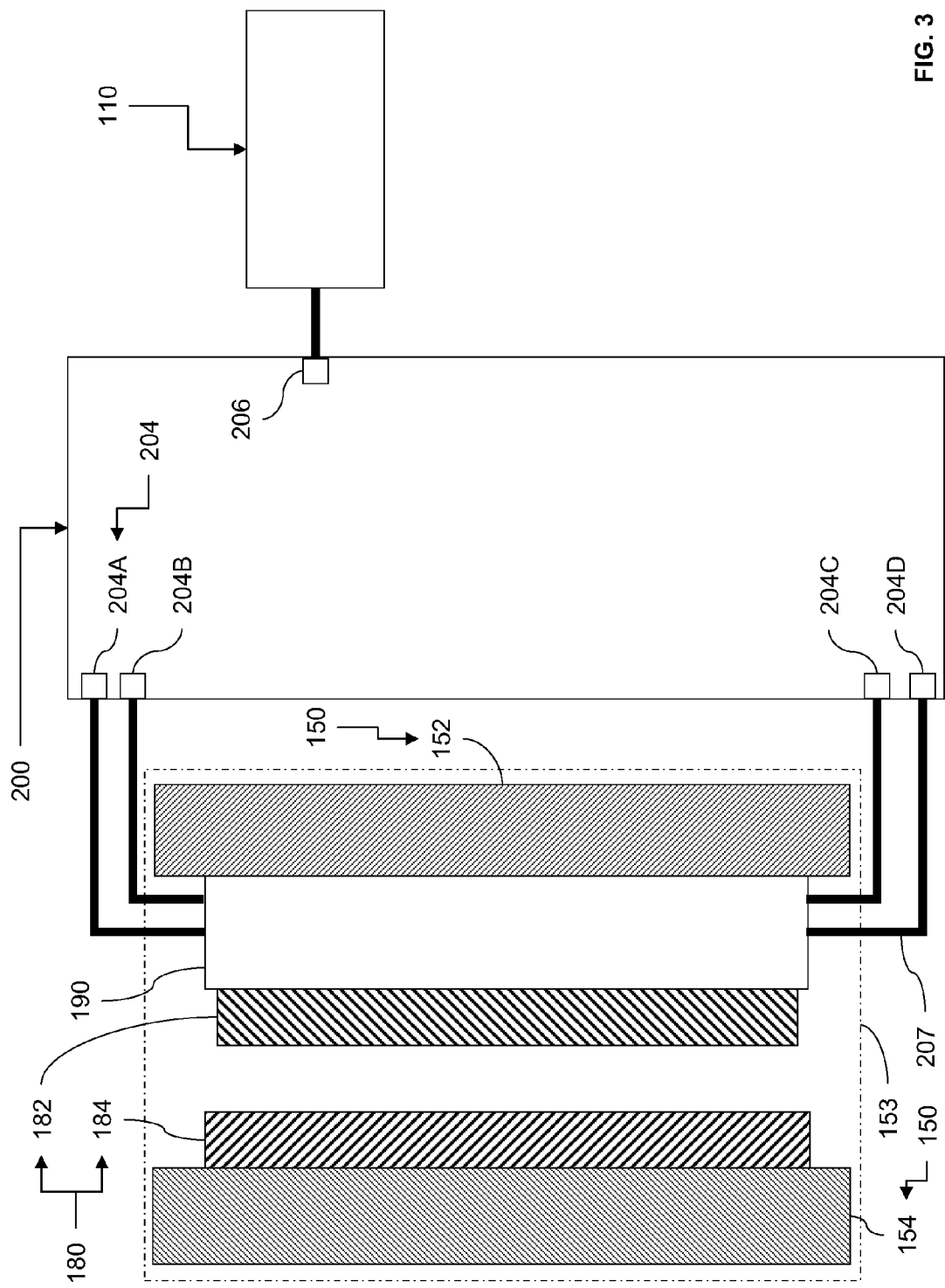

Referring to FIG. 3, the melt-delivery assembly (200) of FIG. 1 may be modified or may be adapted such that: (A) the stationary platen (152) may be configured to support a runner assembly (190), and (B) the multiple-outlet assembly (204) may be configured to transmit, in use, the melt from the melt-preparation assembly (110) to the runner assembly (190) along the multiple conduits (207) bypassing the stationary platen (152). The following statement may be applied to any of the FIGS: it will be appreciated that not all of the multiple conduits (207) must bypass the stationary platen (152), and that some of the multiple conduits (207) may bypass while other multiple conduits (207) may extend through the stationary platen (152).

Figure 4:
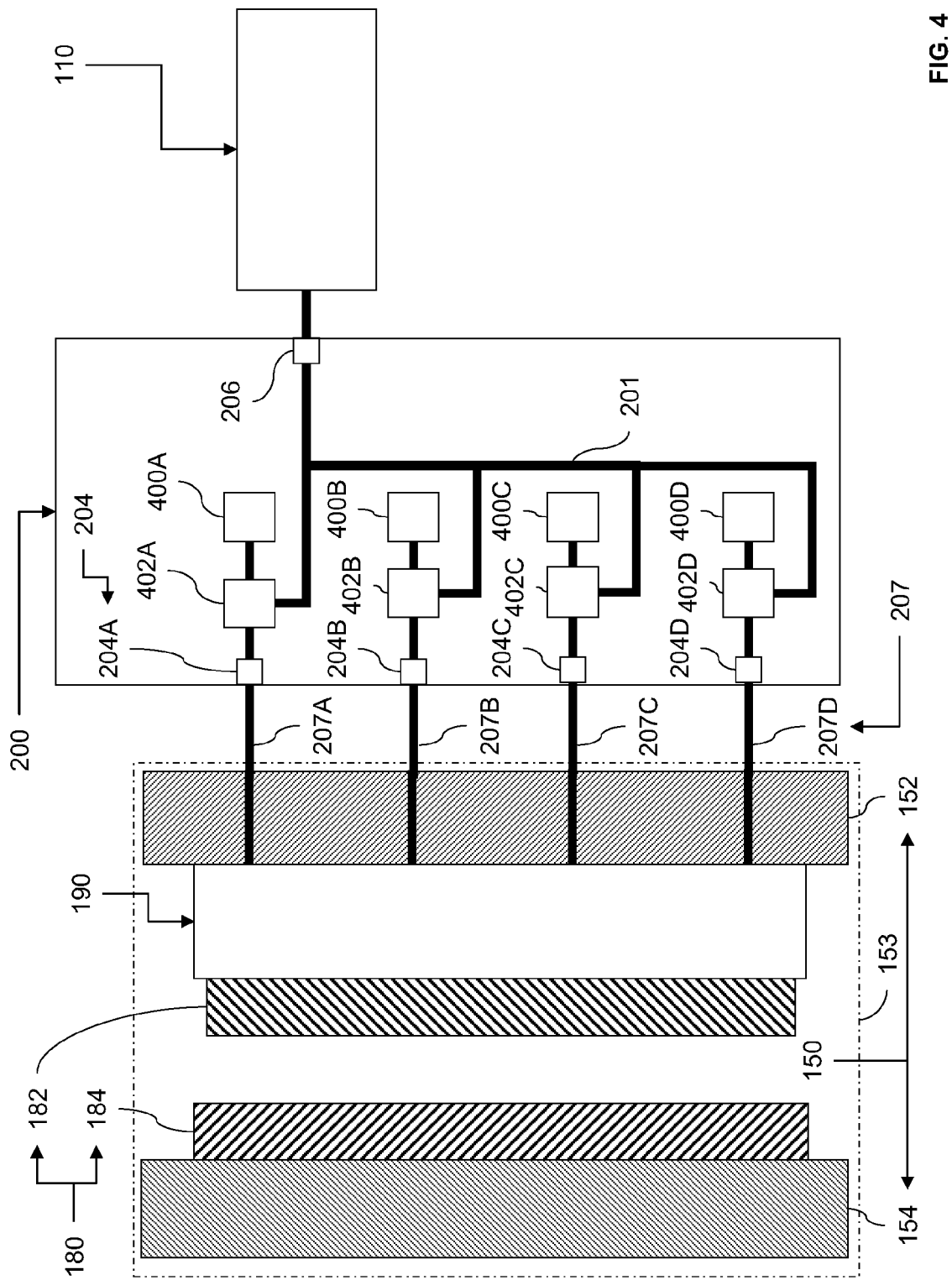

Referring to FIG. 4, the melt-delivery assembly (200) of FIG. 1 may be modified or may be adapted such that: the melt-delivery assembly (200) may include (by way of example and is not limited to): a melt-flow path (201) being configured to fluidly connect the inlet (206) and the multiple-outlet assembly (204) with: (i) a group of shooting-pot assemblies (400A, 400B, 400C, 400D), and (ii) a grouping of valve assemblies (402A, 402B, 402C, 402D) being configured to interact with the group of shooting-pot assemblies (400A, 400B, 400C, 400D). The valve assemblies may be used or may be configured to prevent a black flow of the melt toward the melt-preparation assembly (110). In addition, each outlet of the multiple-outlet assembly (204) may be fluidly connected with a respective valve assembly of the grouping of valve assemblies (402A, 402B, 402C, 402D). According to the example depicted in FIG. 4, melt-delivery assembly (200) may include (by way of example and is not limited to): a plurality of shooting-pot assemblies, and the melt-preparation assembly (110) may be configured to feed or provide the melt to the plurality of shooting-pot assemblies. It will be appreciated that any number of shooting-pot assemblies may be used as may be required. The shooting-pot assemblies may be actuated or activated by a plate assembly, a screw, hydraulic means, electric means, etc. According to the example depicted in FIG. 4, the arrangement being depicted may reduce the number of splits under pressure from known molding systems. The splits from the melt-preparation assembly (110) to the shooting-pot assemblies do not count because they are not under relatively high pressures. It will be appreciated that the multiple conduits (207) may be flexible or inflexible, as may be desired. The multiple conduits (207) may include, by way of example (and not limited to), a first conduit (207A), a second conduit (207B), a third conduit (207C), and a fourth conduit (207D).

Figure 5:
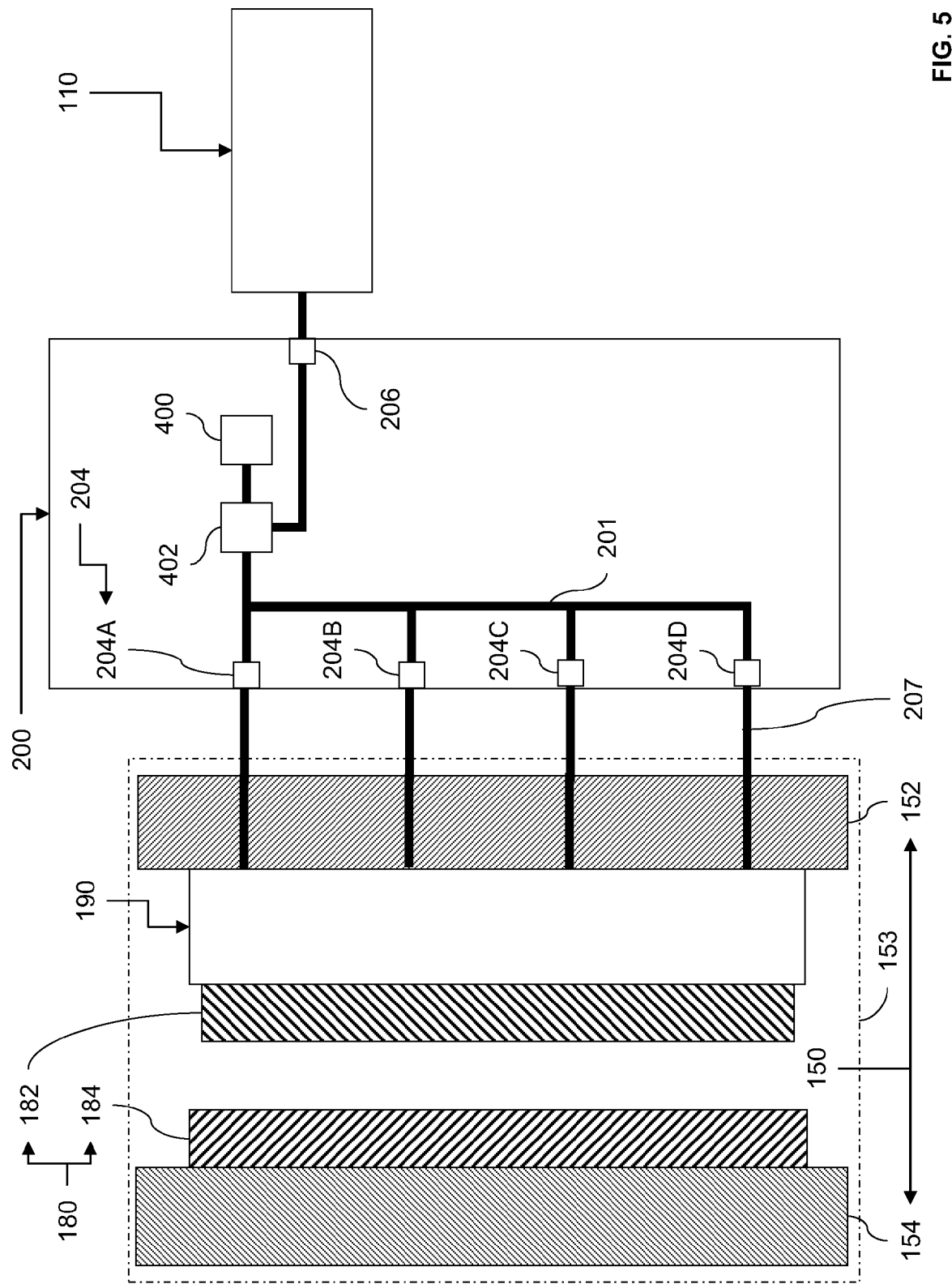

Referring to FIG. 5, the melt-delivery assembly (200) of FIG. 1 may be modified or may be adapted such that: the melt-delivery assembly (200) may include (by way of example and is not limited to): a melt-flow path (201) that may be being configured to fluidly connect the inlet (206) with: (i) a shooting-pot assembly (400), and (ii) a valve assembly (402) that may be configured to interact with the shooting-pot assembly (400). Each outlet of the multiple-outlet assembly (204) may be fluidly connected with the valve assembly (402). The example depicted in FIG. 5 is arranged such that a single shooting-pot assembly may be utilized to feed the melt to the platen envelope (153) via the multiple conduits (207), as opposed to using a plurality of shooting-pot assemblies (such as the example depicted in FIG. 4). According to one variation, the shooting-pot assembly may be positioned at least in part in the stationary platen (152). It will be appreciated that the multiple conduits (207) may be flexible or inflexible.

Figure 6:
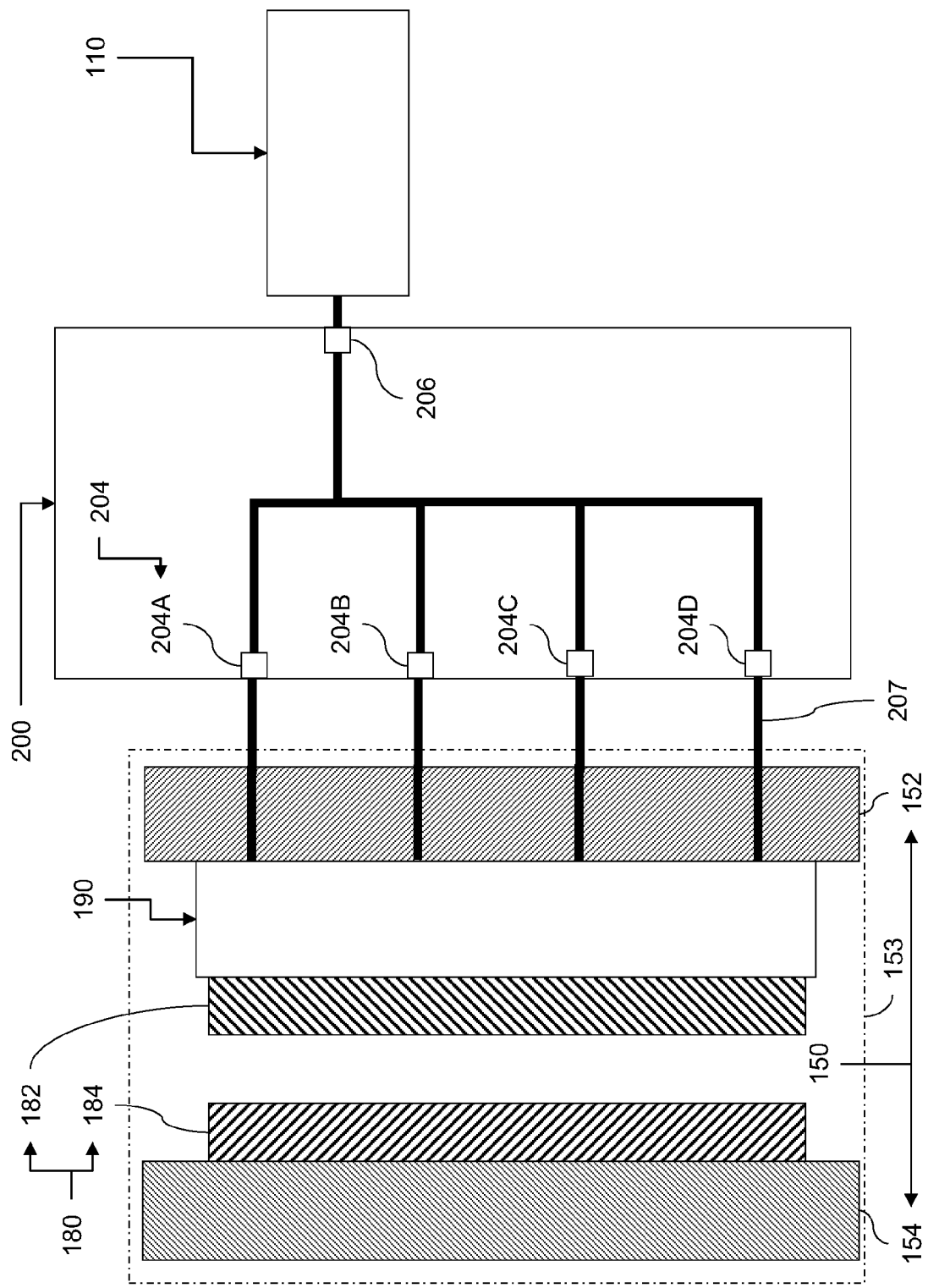

Referring to FIG. 6, the melt-delivery assembly (200) of FIG. 1 may be modified or may be adapted such that: the melt-delivery assembly (200) may include (by way of example and is not limited to): a melt-flow path (201) that may be configured to fluidly connecting the inlet (206) with the multiple-outlet assembly (204).

Figure 7:
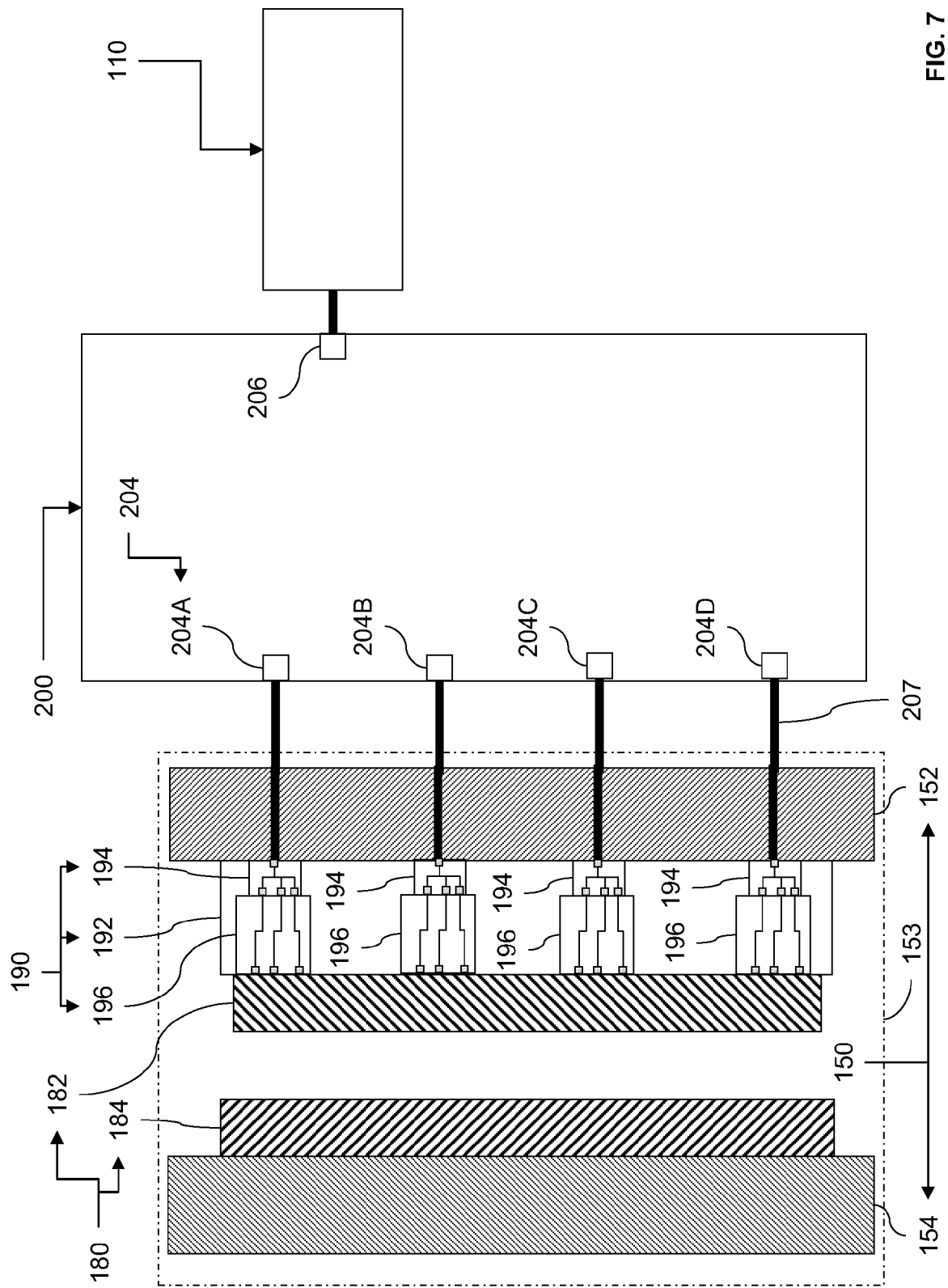

Referring to FIG. 7, the melt-delivery assembly (200) of FIG. 1 may be modified or may be adapted such that: the stationary platen (152) may be configured to support a runner assembly (190), and the multiple-outlet assembly (204) may be configured to transmit, in use, the melt from the melt-preparation assembly (110) to the runner assembly (190). The runner assembly (190) may include (by way of example and is not limited to): a runner-frame assembly (192) that may be configured to support: (i) a set of splitter modules (194) each of which are configured for fluid connection with a respective outlet of the multiple-outlet assembly (204), and (ii) a collection of manifold modules (196). Each manifold module of the collection of manifold modules (196) may be configured for fluid connection with a selected splitter module of the set of splitter modules (194). The collection of manifold modules (196) may be configured for fluid connection with the stationary-mold portion (182) of the mold assembly (180). According to the example depicted in FIG. 7, on the other side of the stationary platen (152), there are splitter modules (194) that are configured to feed the melt to manifolds. It will be appreciated that the splitter modules (194) and the manifold modules (196) may provide as may splits to the flow of the melt in the runner assembly (190) as may be required. It will be appreciated that there is no limit to the number of the splitter modules (194) and the manifold modules (196).

Figure 8:
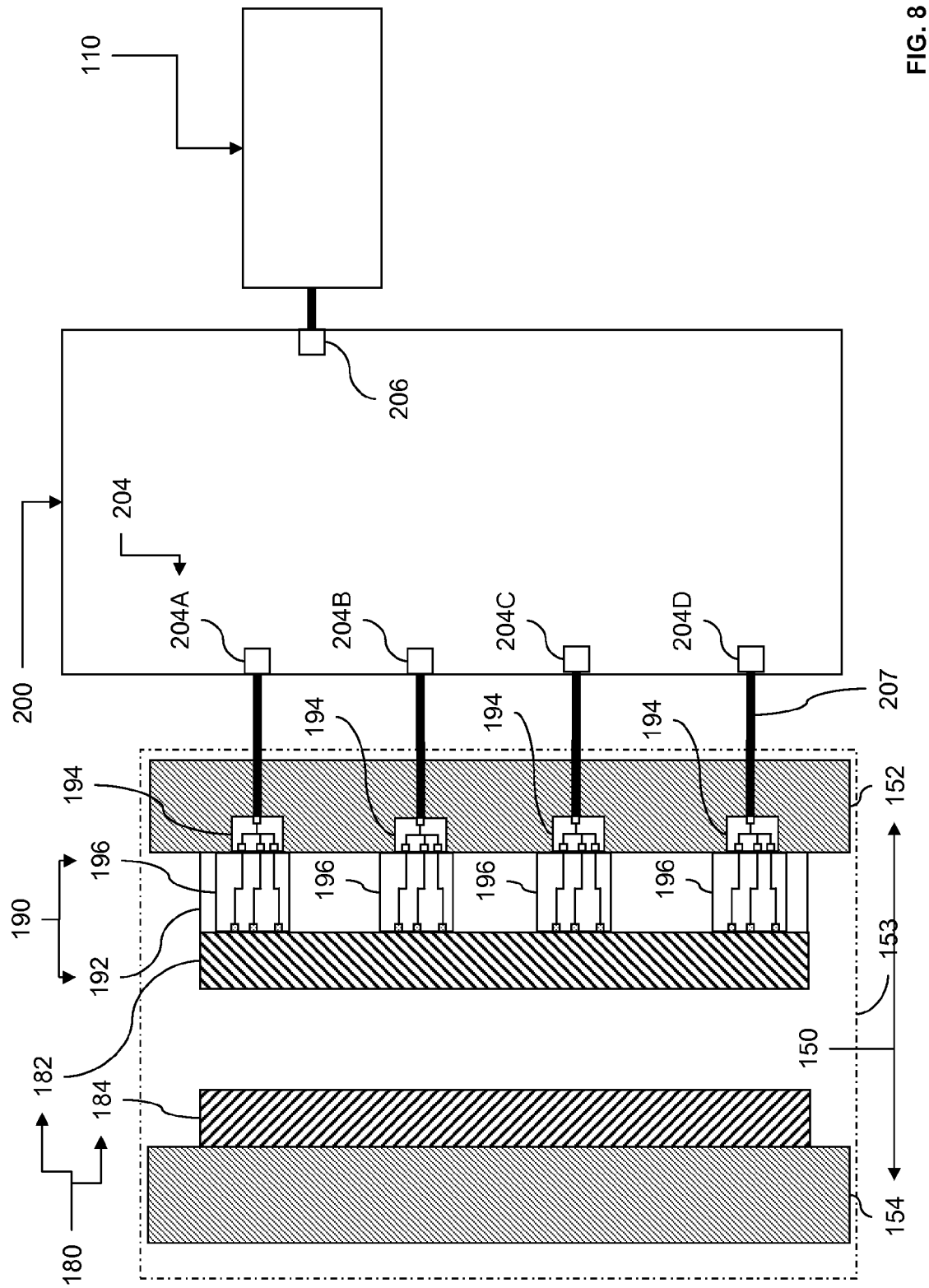

Referring to FIG. 8, the melt-delivery assembly (200) of FIG. 1 may be modified or may be adapted such that: the stationary platen (152) may be configured to support a runner assembly (190). The stationary platen (152) may be configured to house and support a set of splitter modules (194) each of which are configured for fluid connection with a respective outlet of the multiple-outlet assembly (204). The multiple-outlet assembly (204) may be configured to transmit, in use, the melt from the melt-preparation assembly (110) to the set of splitter modules (194). The runner assembly (190) may include (by way of example and is not limited to): a runner-frame assembly (192) that may be configured to support a collection of manifold modules (196). Each manifold module of the collection of manifold modules (196) may be configured for fluid connection with a selected splitter module of the set of splitter modules (194). The collection of manifold modules (196) may be configured for fluid connection with the stationary-mold portion (182) of the mold assembly (180).

Figure 9:
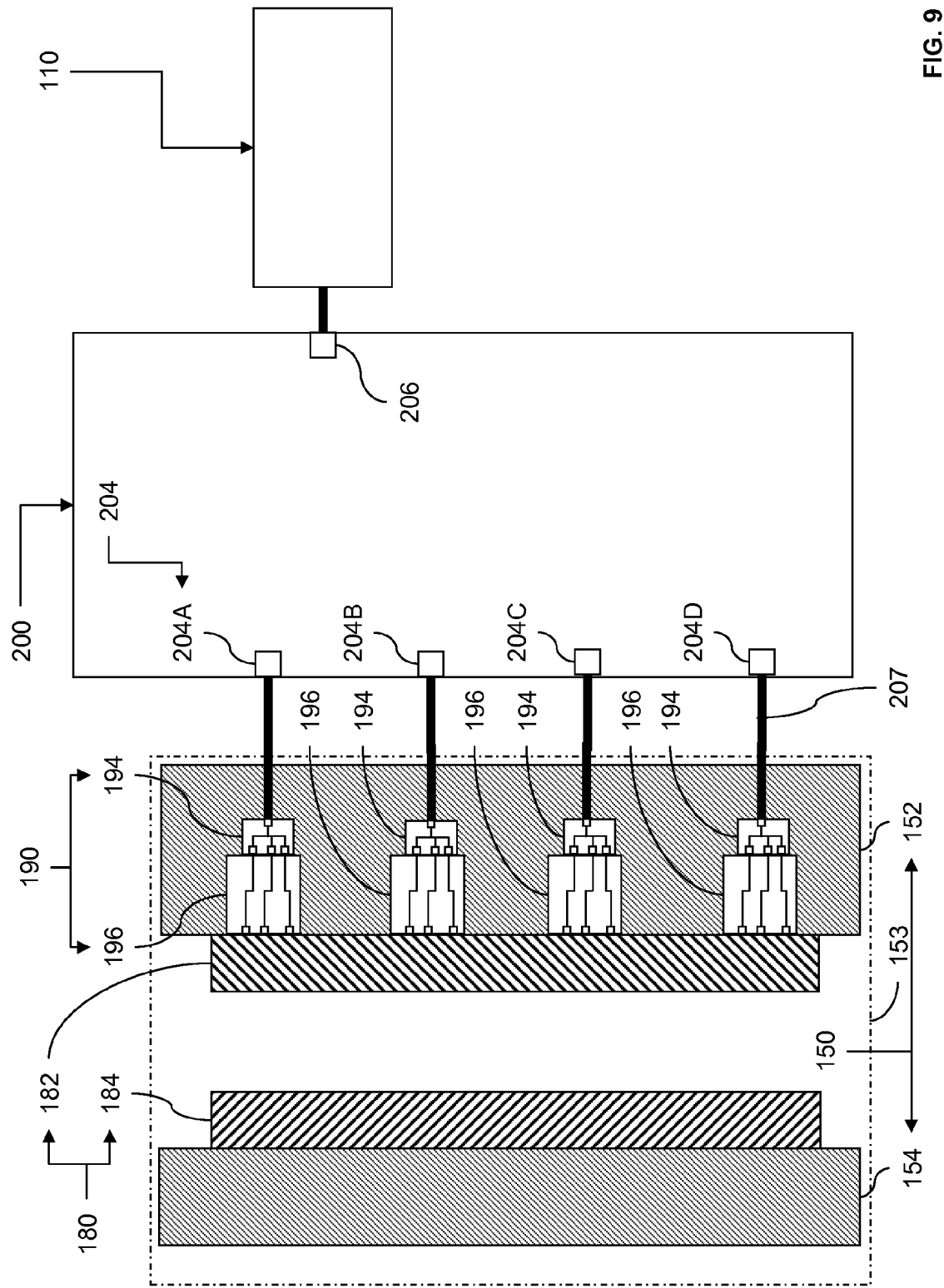

Referring to FIG. 9, the melt-delivery assembly (200) of FIG. 1 may be modified or may be adapted such that: the stationary platen (152) may be configured to house and to support: (i) a set of splitter modules (194) each of which are configured for fluid connection with a respective outlet of the multiple-outlet assembly (204), and (ii) a collection of manifold modules (196). Each manifold module of the collection of manifold modules (196) may be configured for fluid connection with a selected splitter module of the set of splitter modules (194). The collection of manifold modules (196) may be configured for fluid connection with the stationary-mold portion (182) of the mold assembly (180). The multiple-outlet assembly (204) may be configured to transmit, in use, the melt from the melt-preparation assembly (110) to the set of splitter modules (194).

Figure 10:
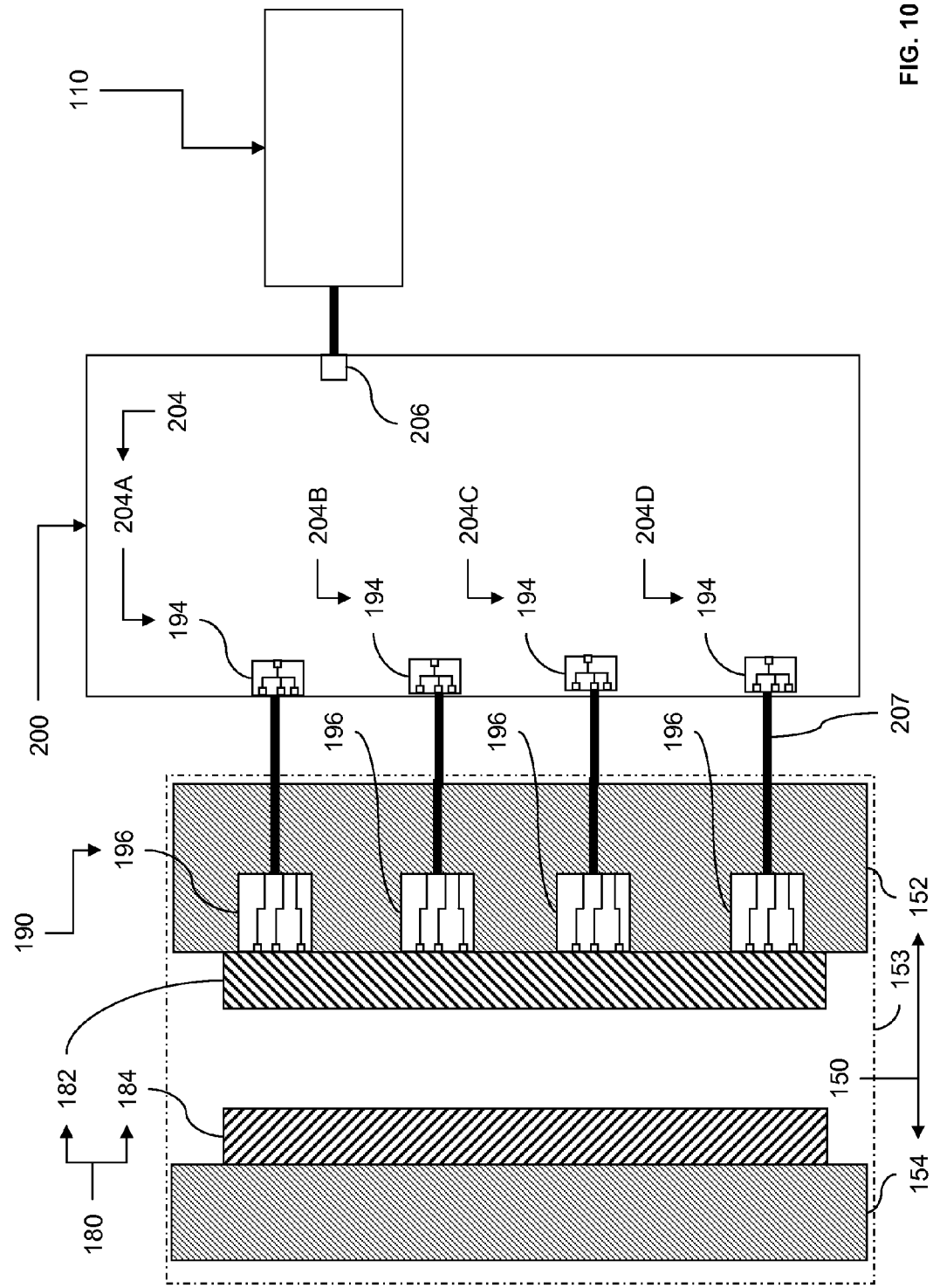

Referring to FIG. 10, the melt-delivery assembly (200) of FIG. 1 may be modified or may be adapted such that: the melt-delivery assembly (200) may be configured to support a set of splitter modules (194) each of which are configured for fluid connection with a respective outlet of the multiple-outlet assembly (204). The stationary platen (152) may be configured to support a collection of manifold modules (196). Each manifold module of the collection of manifold modules (196) may be configured for fluid connection with a selected splitter module of the set of splitter modules (194). The collection of manifold modules (196) may be configured for fluid connection with the stationary-mold portion (182) of the mold assembly (180). The multiple-outlet assembly (204) may be configured to transmit, in use, the melt from the melt-preparation assembly (110) to the set of splitter modules (194).

Figure 11:
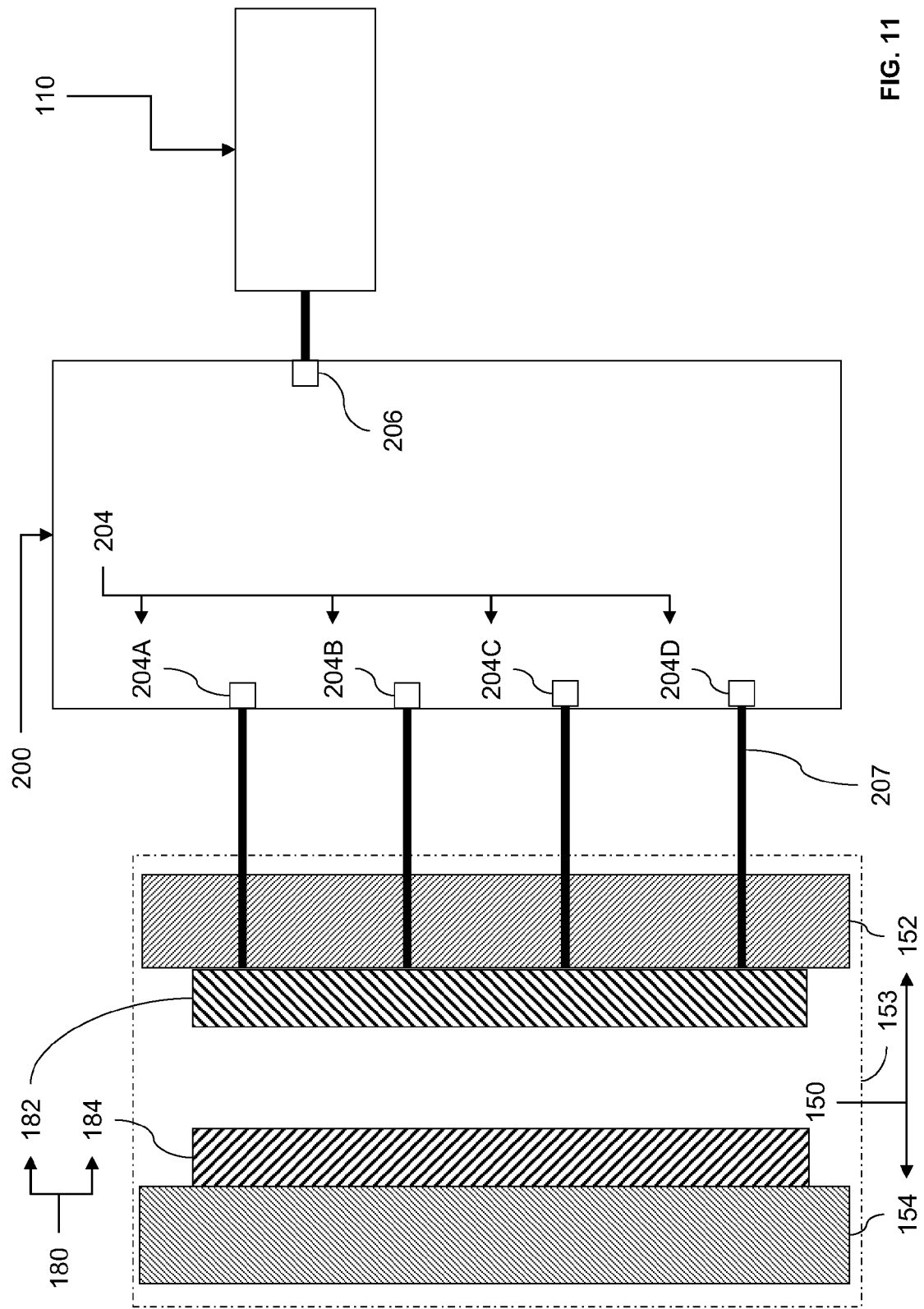

Referring to FIG. 11, the melt-delivery assembly (200) of FIG. 1 may be modified or may be adapted such that: the multiple conduits (207) may be configured to fluidly connect the multiple-outlet assembly (204) with the stationary-mold portion (182) of the mold assembly (180). The multiple conduits (207) may extend through a stationary platen (152).

Figure 12:
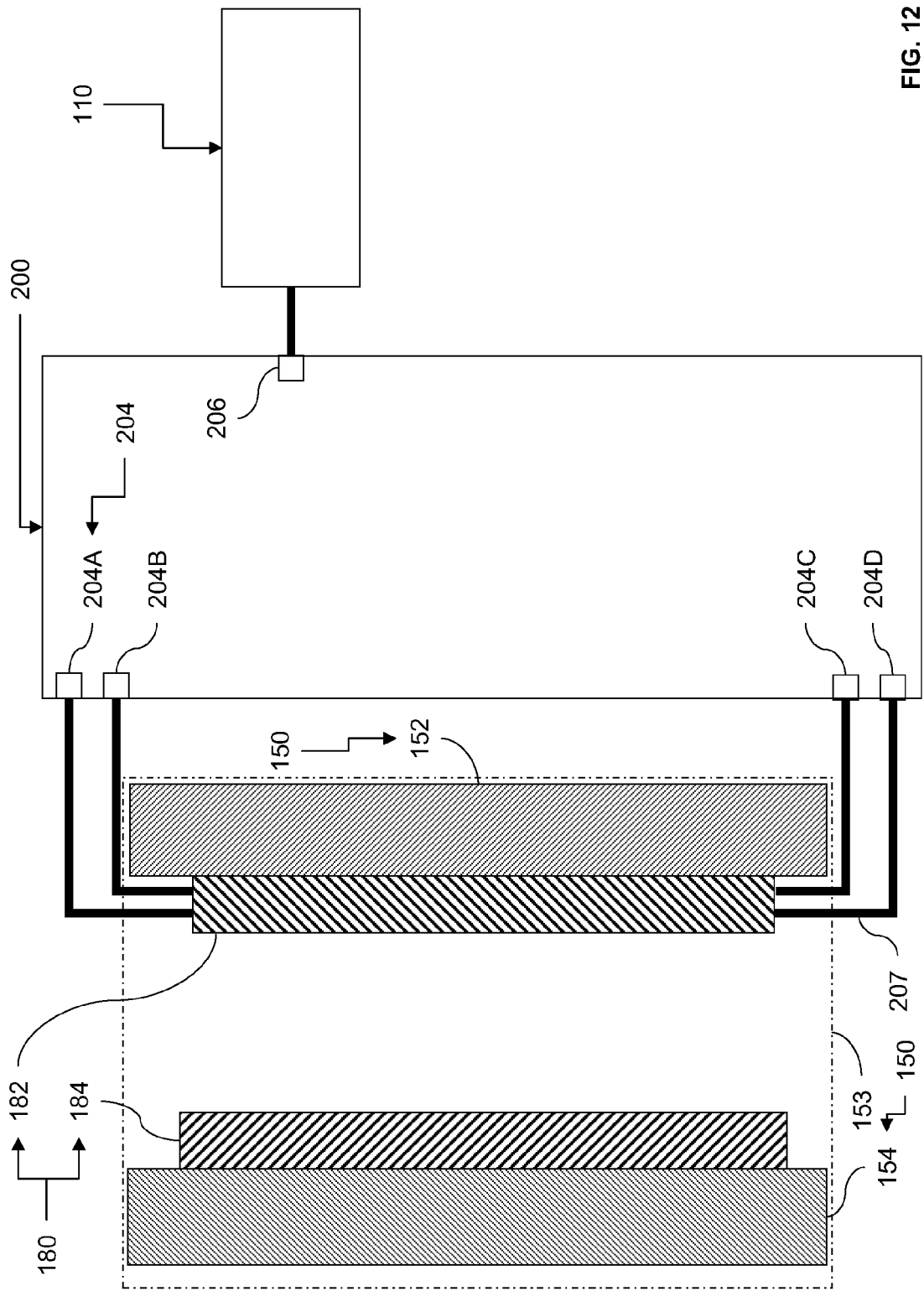

Referring to FIG. 12, the melt-delivery assembly (200) of FIG. 1 may be modified or may be adapted such that: the multiple conduits (207) may be configured to fluidly connect the multiple-outlet assembly (204) with the stationary-mold portion (182) of the mold assembly (180). The multiple conduits (207) may bypass the stationary platen (152).

Figure 13:
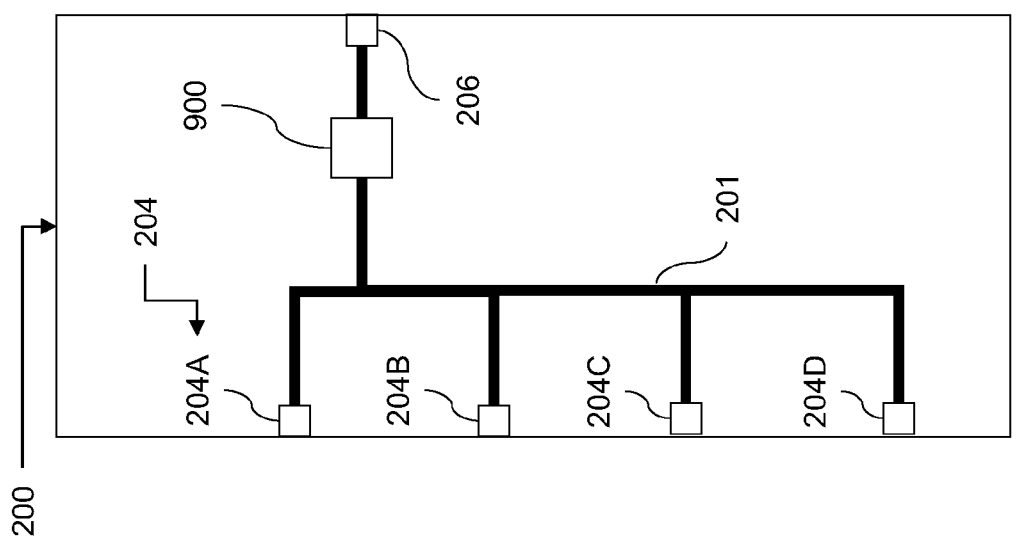

Referring to FIG. 13, the melt-delivery assembly (200) of FIG. 1 may be modified or may be adapted such that: the melt-delivery assembly (200) may include (by way of example and is not limited to): (i) an inlet (206), and (i) a melt-flow path (201) configured to fluidly connect the inlet (206) and the multiple-outlet assembly (204) with a melt-moving assembly (900). The melt-moving assembly (900) may be configured to move (or push) the melt through the melt-flow path (201). The melt-moving assembly (900) may include a shooting-pot assembly or other equivalent mechanism or assembly that may be designed and configured to move the melt through the melt-flow path (201) of the melt-delivery assembly (200). It will be appreciated that the melt-moving assembly (900) may include sub-assemblies or modules that are configured to deliver, in use, the melt through respective selected outlets (204), etc.

Figure 14:
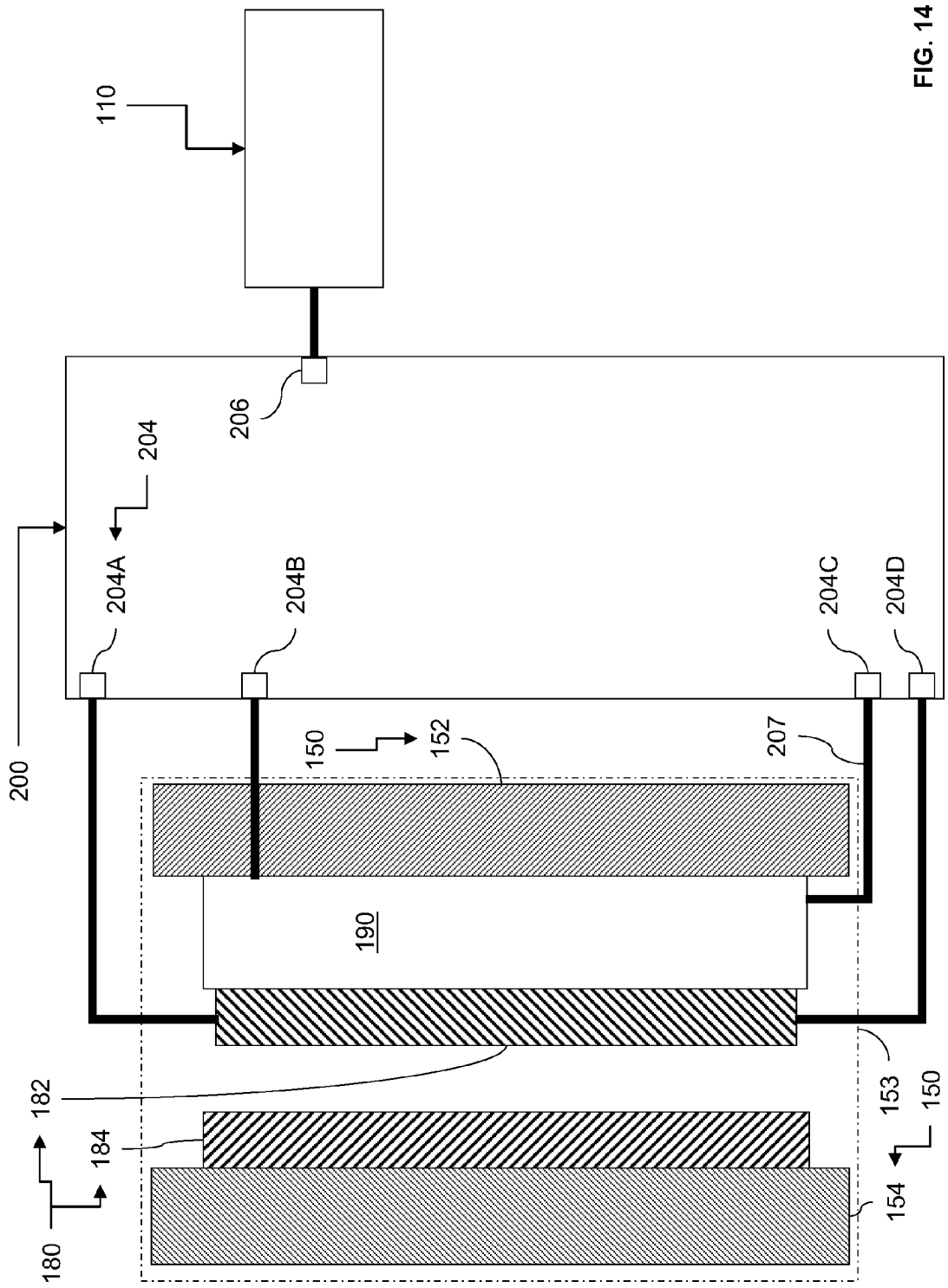

Referring to FIG. 14, the melt-delivery assembly (200) of FIG. 1 may be modified or may be adapted such that: (A) the stationary platen (152) may be configured to support a runner assembly (190), the runner assembly (190) may be configured to connect with a stationary mold portion (182) of a mold assembly (180), and (B) the multiple-outlet assembly (204) may be configured to transmit, in use, the melt from the melt-preparation assembly (110) to the runner assembly (190) and to the stationary mold portion (182) of the mold assembly (180) along the multiple conduits (207). It will be appreciated that the multiple conduits (207) may bypass the stationary platen (152) and/or extend through the stationary platen (152).

It will be appreciated that the assemblies and modules described above may be connected with each other as may be required to perform desired functions and tasks that are within the scope of persons of skill in the art to make such combinations and permutations without having to describe each and every one of them in explicit terms.

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (by way of example and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A melt-delivery assembly, comprising:
a platen envelope comprising a stationary platen and a movable platen, the stationary platen configured to support a stationary mold portion of a mold assembly, the movable platen configured to support a movable mold portion of a mold assembly; and
a frame assembly positioned outside of the platen envelope, the frame assembly configured to receive a melt, and the frame assembly including:
a multiple-outlet assembly configured to fluidly deliver the melt to multiple conduits toward the platen envelope, wherein the multiple conduits are configured to fluidly connect the multiple-outlet assembly with the stationary-mold portion, the multiple conduits extending from outside of the platen envelope through the stationary platen;
an inlet for receiving fluid from a melt preparation assembly;
a group of shooting-pot assemblies;
a melt-flow path being configured to fluidly connect the inlet and the multiple-outlet assembly with the group of shooting-pot assemblies; and
a grouping of valve assemblies being configured to interact with the group of shooting-pot assemblies, wherein each outlet of the multiple-outlet assembly is fluidly connected with a respective valve assembly of the grouping of valve assemblies.

2. The melt-delivery assembly of claim 1, wherein:
the frame assembly is set apart from a melt-preparation assembly.

3. The melt-delivery assembly of claim 1, wherein:
the frame assembly is positioned between the platen envelope and a melt-preparation assembly.

4. The melt-delivery assembly of claim 1, wherein:
the frame assembly is positioned between a stationary platen of the platen envelope and a melt-preparation assembly.

5. The melt-delivery assembly of claim 1, wherein:
the frame assembly is configured to support:
an inlet being configured to: (i) fluidly communicate with a melt-preparation assembly, and (ii) receive, in use, the melt being prepared and provided, in use, by the melt-preparation assembly; and
the multiple-outlet assembly is configured to: (i) fluidly communicate with the inlet, and (ii) transmit, in use, the melt toward a mold assembly being supported by the stationary platen and movable platen.

6. The melt-delivery assembly of claim 1, wherein:
the stationary platen is configured to support a runner assembly, and
the multiple-outlet assembly is configured to transmit, in use, the melt from a melt-preparation assembly to the runner assembly.

7. The melt-delivery assembly of claim 1, wherein:
the stationary platen is configured to support a runner assembly, and
the multiple-outlet assembly is configured to transmit, in use, the melt from a melt-preparation assembly to the runner assembly along the multiple conduits extending through the stationary platen.

8. The melt-delivery assembly of claim 1, wherein:
the melt-delivery assembly includes:
an inlet;
a melt-flow path being configured to fluidly connect the inlet with:
a shooting-pot assembly; and
a valve assembly being configured to interact with the shooting-pot assembly,
each outlet of the multiple-outlet assembly is fluidly connected with the valve assembly.

9. The melt-delivery assembly of claim 1, wherein:
the melt-delivery assembly includes:
an inlet; and
a melt-flow path being configured to fluidly connecting the inlet with the multiple-outlet assembly.

10. The melt-delivery assembly of claim 1, wherein:
the stationary platen is configured to support a runner assembly, and
the multiple-outlet assembly is configured to transmit, in use, the melt from a melt-preparation assembly to the runner assembly,
the runner assembly including:
a runner-frame assembly being configured to support:
a set of splitter modules each of which are configured for fluid connection with a respective outlet of the multiple-outlet assembly; and
a collection of manifold modules, each manifold module of the collection of manifold modules being configured for fluid connection with a selected splitter module of the set of splitter modules, the collection of manifold modules being configured for fluid connection with the stationary-mold portion.

11. The melt-delivery assembly of claim 1, wherein:
a stationary platen is configured to support a runner assembly, and to house and support a set of splitter modules each of which are configured for fluid connection with a respective outlet of the multiple-outlet assembly; and
the multiple-outlet assembly is configured to transmit, in use, the melt from the a melt-preparation assembly to the set of splitter modules,
the runner assembly including:
a runner-frame assembly being configured to support:
a collection of manifold modules, each manifold module of the collection of manifold modules being configured for fluid connection with a selected splitter module of the set of splitter modules, the collection of manifold modules being configured for fluid connection with the stationary-mold portion.

12. The melt-delivery assembly of claim 1, wherein:
the stationary platen is configured to house and to support:
(i) a set of splitter modules each of which are configured for fluid connection with a respective outlet of the multiple-outlet assembly, and
(ii) a collection of manifold modules, each manifold module of the collection of manifold modules being configured for fluid connection with a selected splitter module of the set of splitter modules, the collection of manifold modules being configured for fluid connection with the stationary-mold portion; and
the multiple-outlet assembly is configured to transmit, in use, the melt from a melt-preparation assembly to the set of splitter modules.

13. The melt-delivery assembly of claim 1, wherein:
the melt-delivery assembly is configured to support a set of splitter modules each of which are configured for fluid connection with a respective outlet of the multiple-outlet assembly;
the stationary platen is configured to support a collection of manifold modules, each manifold module of the collection of manifold modules being configured for fluid connection with a selected splitter module of the set of splitter modules, the collection of manifold modules being configured for fluid connection with the stationary-mold portion; and
the multiple-outlet assembly is configured to transmit, in use, the melt from a melt-preparation assembly to the set of splitter modules.

14. The melt-delivery assembly of claim 1, wherein:
the melt-delivery assembly includes:
an inlet;
a melt-flow path being configured to fluidly connect the inlet and the multiple-outlet assembly with:
a melt-moving assembly being configured to move the melt through the melt-flow path.

15. The melt-delivery assembly of claim 1, wherein:
the stationary platen is configured to support a runner assembly, the runner assembly being configured to connect with the movable-mold portion, and
the multiple-outlet assembly is configured to transmit, in use, the melt from the melt-preparation assembly to the runner assembly and to the stationary mold portion along the multiple conduits.

16. A molding system, comprising:
the melt-delivery assembly of claim 1.

17. A melt-preparation assembly, comprising:
the melt-delivery assembly of claim 1.

18. A melt-delivery assembly, comprising:
a platen envelope comprising a stationary platen and a movable platen, the stationary platen configured to support a stationary mold portion of a mold assembly, the movable platen configured to support a movable mold portion of a mold assembly; and
a frame assembly positioned outside of a platen envelope, the frame assembly configured to receive a melt, and the frame assembly including:
a multiple-outlet assembly configured to fluidly deliver the melt to multiple conduits toward the platen envelope, wherein:
the stationary platen is configured to support a runner assembly, and
the multiple-outlet assembly is configured to transmit, in use, the melt from a melt-preparation assembly to the runner assembly along the multiple conduits extending from outside of the platen envelope bypassing the stationary platen;
an inlet for receiving fluid from a melt preparation assembly;
a group of shooting-pot assemblies;
a melt-flow path being configured to fluidly connect the inlet and the multiple-outlet assembly with the group of shooting-pot assemblies; and
a grouping of valve assemblies being configured to interact with the group of shooting-pot assemblies, wherein each outlet of the multiple-outlet assembly is fluidly connected with a respective valve assembly of the grouping of valve assemblies.

19. A melt-delivery assembly, comprising:
a platen envelope comprising a stationary platen and a movable platen, the stationary platen configured to support a stationary mold portion of a mold assembly, the movable platen configured to support a movable mold portion of a mold assembly; and
a frame assembly positioned outside of a platen envelope, the frame assembly configured to receive a melt, and the frame assembly including:
a multiple-outlet assembly configured to fluidly deliver the melt to multiple conduits toward the platen envelope, wherein:
the multiple conduits are configured to fluidly connect the multiple-outlet assembly with the stationary-mold portion of a mold assembly, the multiple conduits extending from outside of the platen envelope and bypassing the stationary platen;
an inlet for receiving fluid from a melt preparation assembly;
a group of shooting-pot assemblies;
a melt-flow path being configured to fluidly connect the inlet and the multiple-outlet assembly with the group of shooting-pot assemblies; and
a grouping of valve assemblies being configured to interact with the group of shooting-pot assemblies, wherein each outlet of the multiple-outlet assembly is fluidly connected with a respective valve assembly of the grouping of valve assemblies.

* * * * *